United States Patent
Komoriya

(10) Patent No.: US 9,114,793 B2
(45) Date of Patent: Aug. 25, 2015

(54) BRAKE CONTROL DEVICE

(71) Applicant: Mitsubishi Heavy Industries, Ltd., Tokyo (JP)

(72) Inventor: Toshihiko Komoriya, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 205 days.

(21) Appl. No.: 13/686,006

(22) Filed: Nov. 27, 2012

(65) Prior Publication Data

US 2013/0134770 A1  May 30, 2013

(30) Foreign Application Priority Data

Nov. 30, 2011 (JP) ................................. 2011-262822

(51) Int. Cl.
| | | |
|---|---|---|
| *B60T 13/68* | (2006.01) | |
| *B60T 13/66* | (2006.01) | |
| *B60T 15/02* | (2006.01) | |
| *B60T 13/40* | (2006.01) | |

(52) U.S. Cl.
CPC ............ *B60T 13/683* (2013.01); *B60T 13/662* (2013.01); *B60T 15/027* (2013.01); *B60T 13/40* (2013.01); *Y10S 303/10* (2013.01)

(58) Field of Classification Search
CPC ..... B60T 13/683; B60T 13/40; B60T 13/662; B60T 15/027; Y10S 303/10
See application file for complete search history.

(56) References Cited

U.S. PATENT DOCUMENTS

| | | | |
|---|---|---|---|
| 5,700,065 A | 12/1997 | Jamieson | |
| 8,246,121 B2 * | 8/2012 | Homann et al. | ........... 303/119.1 |
| 2013/0134769 A1 * | 5/2013 | Komoriya et al. | .............. 303/14 |

FOREIGN PATENT DOCUMENTS

| | | |
|---|---|---|
| CN | 2622036 | 6/2004 |
| CN | 1792691 | 6/2006 |
| CN | 1948064 | 4/2007 |
| CN | 201009869 | 1/2008 |
| CN | 202006806 | 10/2011 |
| EP | 2 340 972 | 7/2011 |
| EP | 2 505 451 | 10/2012 |
| JP | 4-127065 | 11/1992 |
| JP | 2000-272501 | 10/2000 |
| JP | 2000272501 A * | 10/2000 .............. B60T 15/36 |

(Continued)

OTHER PUBLICATIONS

Japanese Notice of Reasons for Rejection issued Sep. 17, 2013 in corresponding Japanese Patent Application No. 2011-262822 with English translation.

(Continued)

*Primary Examiner* — Thomas Irvin
(74) *Attorney, Agent, or Firm* — Wenderoth, Lind & Ponack, L.L.P.

(57) ABSTRACT

A brake control device includes: a valve block furnished with valves which regulate or switch air pressure; a controller which electrically controls a plurality of solenoid valves via solenoid valve control signal wires; and an electropneumatic plate which includes solenoid valve connection air channels for the plurality of solenoid valves, and onto which is installed the plurality of solenoid valves so as to communicate with the solenoid valve connection air channels. The plate is secured to the valve block, and at least one of the solenoid valve connection air channels communicates with a support member air channel formed in the valve block.

8 Claims, 7 Drawing Sheets

(56) References Cited

FOREIGN PATENT DOCUMENTS

| | | | |
|---|---|---|---|
| JP | 2005-67312 | 3/2005 | |
| JP | 2005067312 A * | 3/2005 | ................ B60T 8/30 |
| JP | 2006-168664 | 6/2006 | |
| JP | 2006168664 A * | 6/2006 | |
| JP | 4310149 | 8/2009 | |
| JP | 4435727 | 3/2010 | |
| JP | 4485347 | 6/2010 | |
| JP | 4699020 | 6/2011 | |
| WO | 2010/032677 | 3/2010 | |
| WO | 2011/024406 | 3/2011 | |
| WO | 2011/064851 | 6/2011 | |

OTHER PUBLICATIONS

Japanese Notice of Reasons for Rejection issued Sep. 24, 2013 in corresponding Japanese Patent Application No. 2011-262823 with English translation.

U.S. Office Action issued Feb. 10, 2014 in U.S. Appl. No. 13/684,872.

U.S. Patent and Trademark Office Notice of Allowance issued May 15, 2014 in U.S. Appl. No. 13/684,872.

Chinese Office Action issued Jul. 22, 2014 in corresponding Chinese Patent Application No. 201210599101.6 with English translation.

Office Action issued Jan. 23, 2015 in corresponding Chinese Application No. 201210597250.9, with partial English translation.

* cited by examiner

BRAKE CONTROL DEVICE

BACKGROUND OF THE INVENTION

1. Field of the Invention

The present invention relates to a brake control device which is installed in a railway vehicle and operates an air brake.

Priority is claimed on Japanese Patent Application No. 2011-262822, filed Nov. 30, 2011, the contents of which are incorporated herein by reference.

2. Description of the Related Art

Conventionally, there is known a brake control device for a railway vehicle, comprising as a brake system for service operation; a pressure control section which outputs a brake command signal (electric signal), a solenoid valve which outputs a brake command pressure (air pressure) proportional to the brake command signal, and a relay valve which, using the brake command pressure output by the solenoid valve as a control pressure, applies amplification accordingly and outputs the resulting air pressure to a brake cylinder. As a brake system for emergency operation, the brake system comprises a variable load valve which detects pressure variation in proportion to the total weight of the vehicle including movable load such as passengers and cargo, and provides this detected output to the relay valve after amplification via a solenoid valve.

Typically, because the space for mounting the brake control device on the vehicle is limited, there is a problem in how to reduce the size of the device while still maintaining its performance. Thus, respective valves including solenoid valves, relay valves, double check valves, and variable load valves are organized into related groups, each group is installed on a block, and the plurality of solenoid valves are wired to a controller (refer for example to Japanese Patent No. 4310149 and Japanese Patent No. 4485347).

However, in the brake control device described above, the plurality of solenoid valves are interspersed throughout the device. Therefore, there is a problem of wiring because wiring required from each sensor to the controller, and moreover, complex wiring from the solenoid valves to the controller is required in the vicinity of components such as the valve blocks.

SUMMARY OF THE INVENTION

An object of the present invention is to provide a brake control device in which solenoid valve control signal wires from the solenoid valves to the controller do not need to be complex wiring in the vicinity of components such as valve blocks, and which can improve the degree of freedom of routing design in terms of the solenoid valve-connecting air passages which connect to the solenoid valves, and as a result the device can be reduced in size.

A brake control device of the present invention comprises; an air braking section which converts an air pressure produced by an air supply source to a drive pressure of a predetermined pressure which drives a brake; and a pipe seat furnished with a first surface having an external port that connects to the air supply source and a braking side and a second surface to which the air braking section is connected. The air braking section comprises: a valve block furnished with valves which regulate or switch and then output input air pressure; a plurality of solenoid valves which have input ports into which air pressure is input and output ports from which air pressure is output, and which switch between open and closed states; a controller which is electrically connected to the plurality of solenoid valves by solenoid valve control signal wires, and which controls the plurality of solenoid valves electrically; and a plate which comprises solenoid valve connection air channels which connect to the input ports and output ports of the plurality of solenoid valves, and onto which is installed the plurality of solenoid valves such that the solenoid valve connection air channels communicate with the corresponding input ports and output ports. The plate is secured to a support member being the pipe seat or the valve block, and at least one of the solenoid valve connection air channels communicates with a support member air channel formed in the support member.

According to the brake control device of the present invention, because the plurality of solenoid valves are installed on the plate secured to the support member and consolidated into one location, the solenoid valve control signal wires from the solenoid valves to the controller do not demand complex wiring in the vicinity of the valve block and other components. Furthermore, regarding the solenoid valve connection air channels that connect to the solenoid valves, because the position where they connect to the solenoid valves and the position where they connect to the support member can be selected freely, and they can be laid out freely within the plate so as to connect these positions to each other, the plurality of solenoid valves can be disposed in a compact arrangement on the plate, unrestricted by the locations of the connecting air channels.

In the brake control device of the present invention, at least two of the solenoid valve control signal wires connected to the plurality of solenoid valves may be bundled into a single connector and connected to the controller.

According to the brake control device of the present invention, the solenoid valve control signal wires can be better organized, and connecting and disconnecting the solenoid valves to and from the controller is simplified.

In the brake control device of the present invention, the air brake section may comprise a plurality of pressure sensors which detect air pressure, installed on the plate and connected to the controller via pressure detection wires, and sensor air channels which connect to the pressure sensors may be formed in the plate.

According to the brake control device of the present invention, the pressure sensors connected to the controller via pressure detection wires can also be installed on the plate and consolidated into one location, and the wiring connected to the controller, including the pressure detection wires, can be better organized.

In the brake control device of the present invention, the valve block may comprise a housing with a valve insertion section into which the valves are inserted, and the plate may be secured to a surface of the housing in which an opening of the valve insertion section is formed.

According to the brake control device of the present invention, even on the surface of the housing where the opening of the valve insertion section is formed and where it is difficult to form air channels, the plate can be secured and the plurality of solenoid valves disposed, enabling an efficient use of space and thus a more compact device.

In the brake control device of the present invention, because the plurality of solenoid valves are installed on the plate secured to the support member and consolidated into one location, the solenoid valve control signal wires from the solenoid valves to the controller do not demand complex wiring in the vicinity of the valve block and other components. Furthermore, regarding the solenoid valve connection air channels that connect to the solenoid valves, because the position where they connect to the solenoid valves and the position where they connect to the support member can be selected freely, and they can be laid out freely within the plate provided that these positions connect to each other, the plurality of solenoid valves can be disposed in a compact arrangement on the plate, unrestricted by the locations of the connecting air channels.

DETAILED DESCRIPTION OF THE INVENTION

Next, a brake control device according to an embodiment of the present invention is described with reference to the drawings. The embodiment described below is a preferred specific example of the brake control device of the present invention, and is subject to various restrictions considered technically favorable. However, the technical scope of the invention is not limited thereto unless specifically stated. Furthermore, the constituent elements of the embodiment described below can be replaced and substituted as needed by existing constituent elements or the like, and a number of variations are possible including combinations with other existing constituent elements. Accordingly, the descriptions of the embodiment below are not to be construed as limiting the contents of the invention as described in the claims.

The brake control device of the present invention is a control device for a brake device for braking (specifically air braking) a rail vehicle, which controls the flow of compressed air supplied to a brake cylinder (brake) serving as a brake device provided for each axle. Furthermore, in this embodiment, because the brake control device simultaneously brakes the two axles at the front and rear of one carriage (vehicle), flow control of compressed air to the brake cylinders is performed separately for each brake cylinder.

Figure 1:
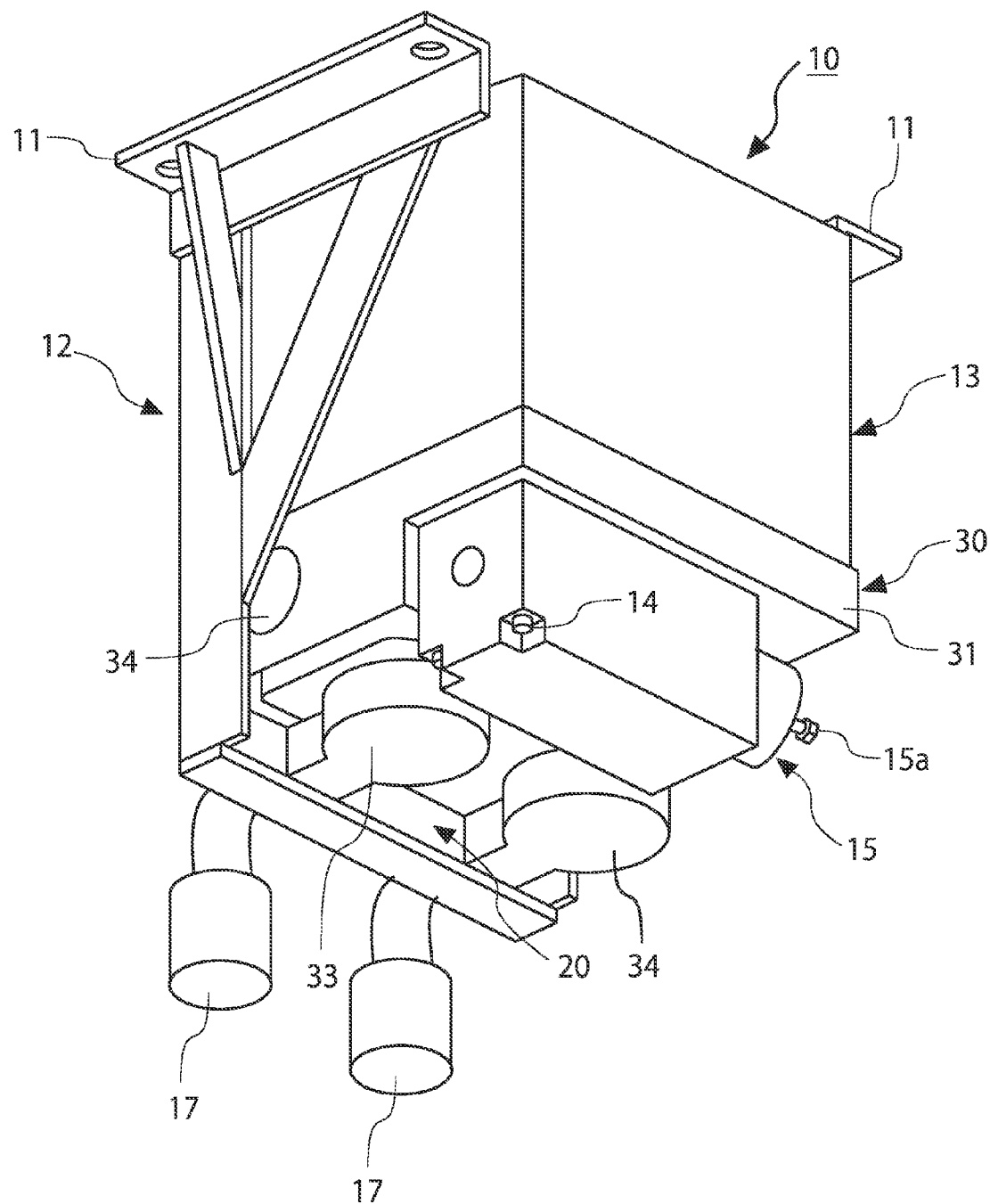
FIG. 1 is a perspective view of a brake control device according to an embodiment of the present invention, viewed from the base direction.
Figure 2:
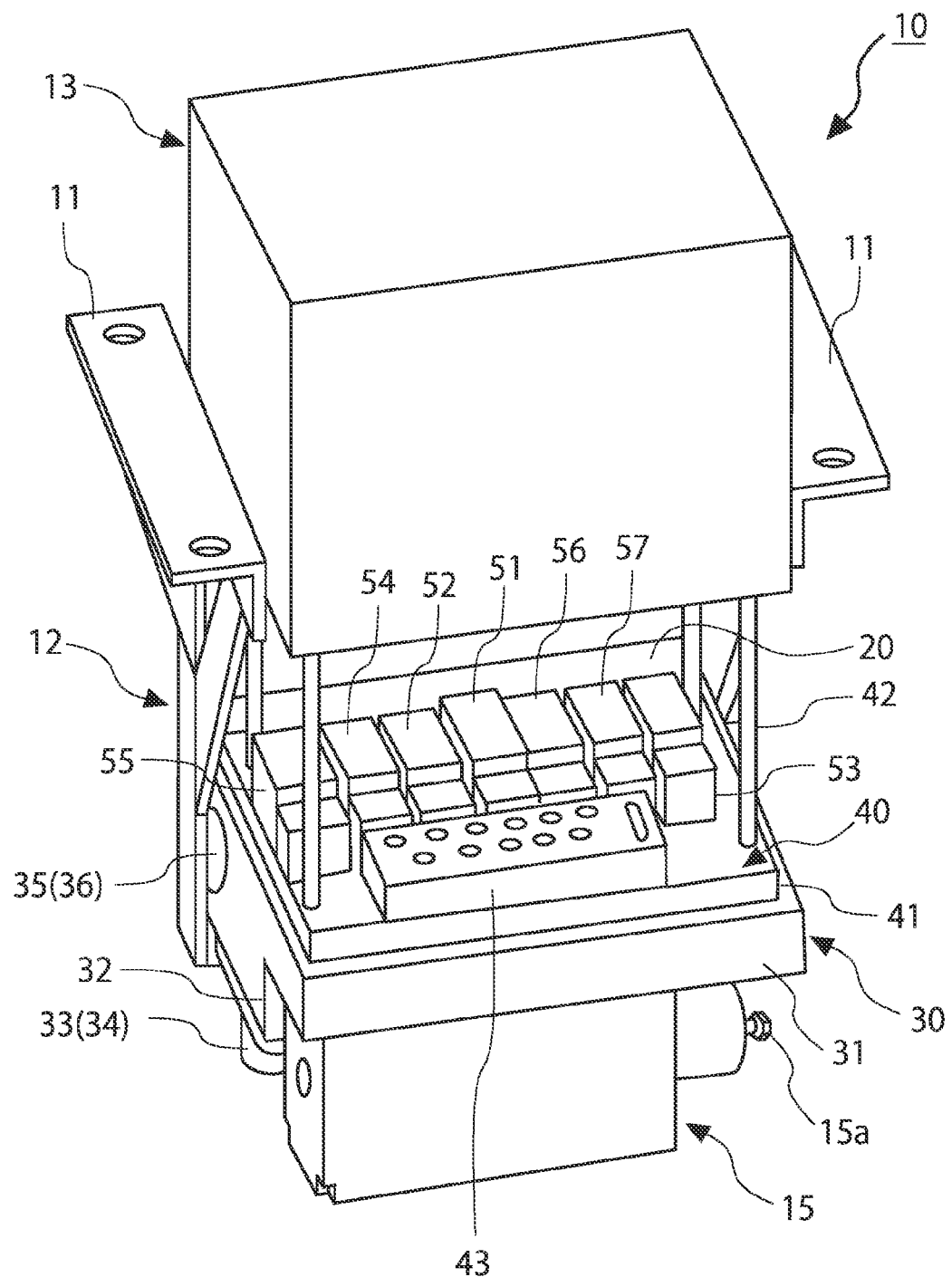
FIG. 2 is a perspective view of the brake control device according to the embodiment of the present invention, viewed from the planar direction.
Figure 3:
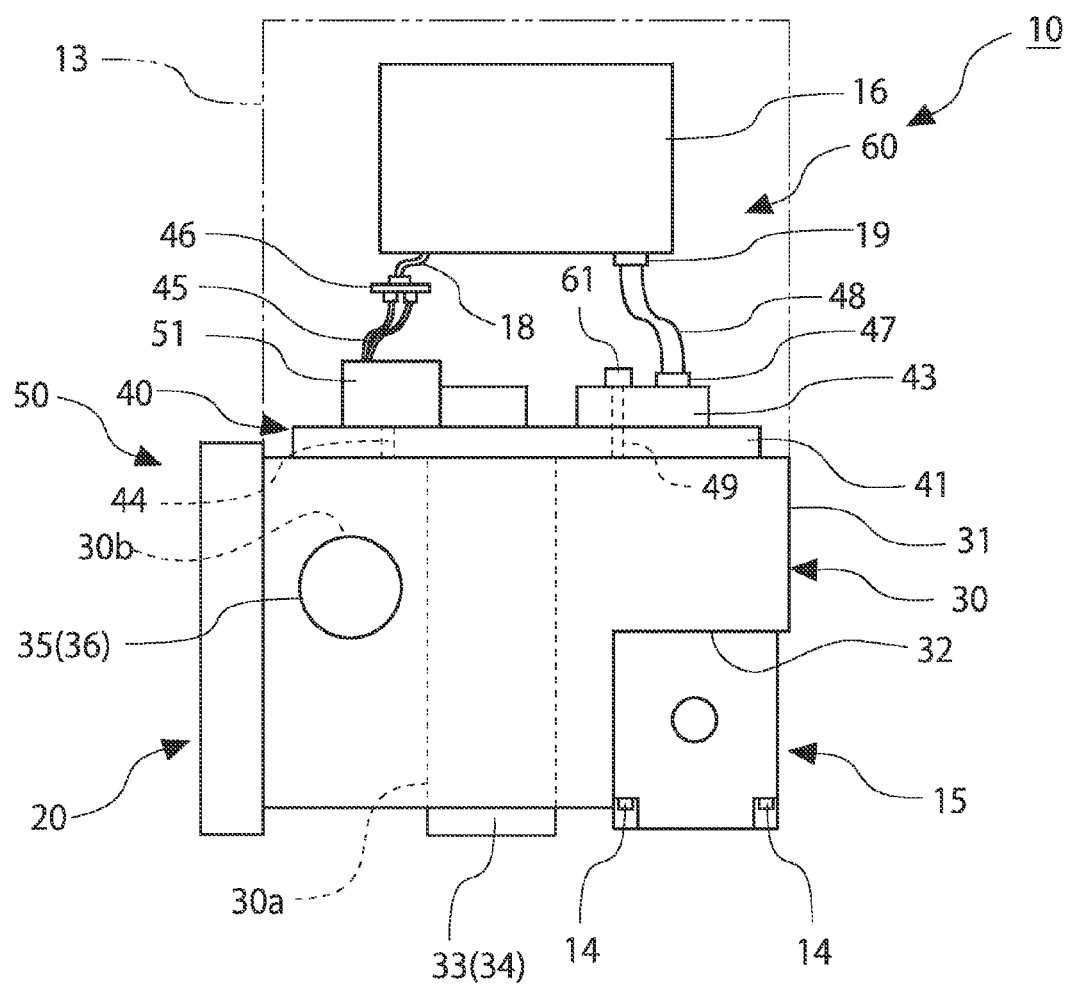
FIG. 3 is a front view of the brake control device according to the embodiment of the present invention.

In FIG. 1 to FIG. 3, the brake control device 10 is held by a frame 12 comprising a bracket 11 to be secured to a vehicle (not shown in the figure). Furthermore, the brake control device 10 comprises; a casing 13 in the shape of a housing open at the bottom, a pipe seat 20 secured to the frame 12, a valve block 30 secured to the pipe seat 20, an electropneumatic plate (plate) 40 which is always covered by the casing 13 and is secured to the top surface of the valve block 30, a variable load valve 15 secured to the valve block 30 by bolts 14, and a controller 16 which performs various controls related to braking. Furthermore, an air braking section 60 includes the valve block 30 and the electropneumatic plate 40 together with the variable load valve 15 and the controller 16. The method of securing the variable load valve 15 to the valve block 30, provided that the securing method is capable of maintaining a seal, can use securing means other than the bolts 14. Furthermore, although the pipe seat 20 is made of steel in the present embodiment, other materials such as aluminum can be used to form the pipe seat 20.

Figure 4:
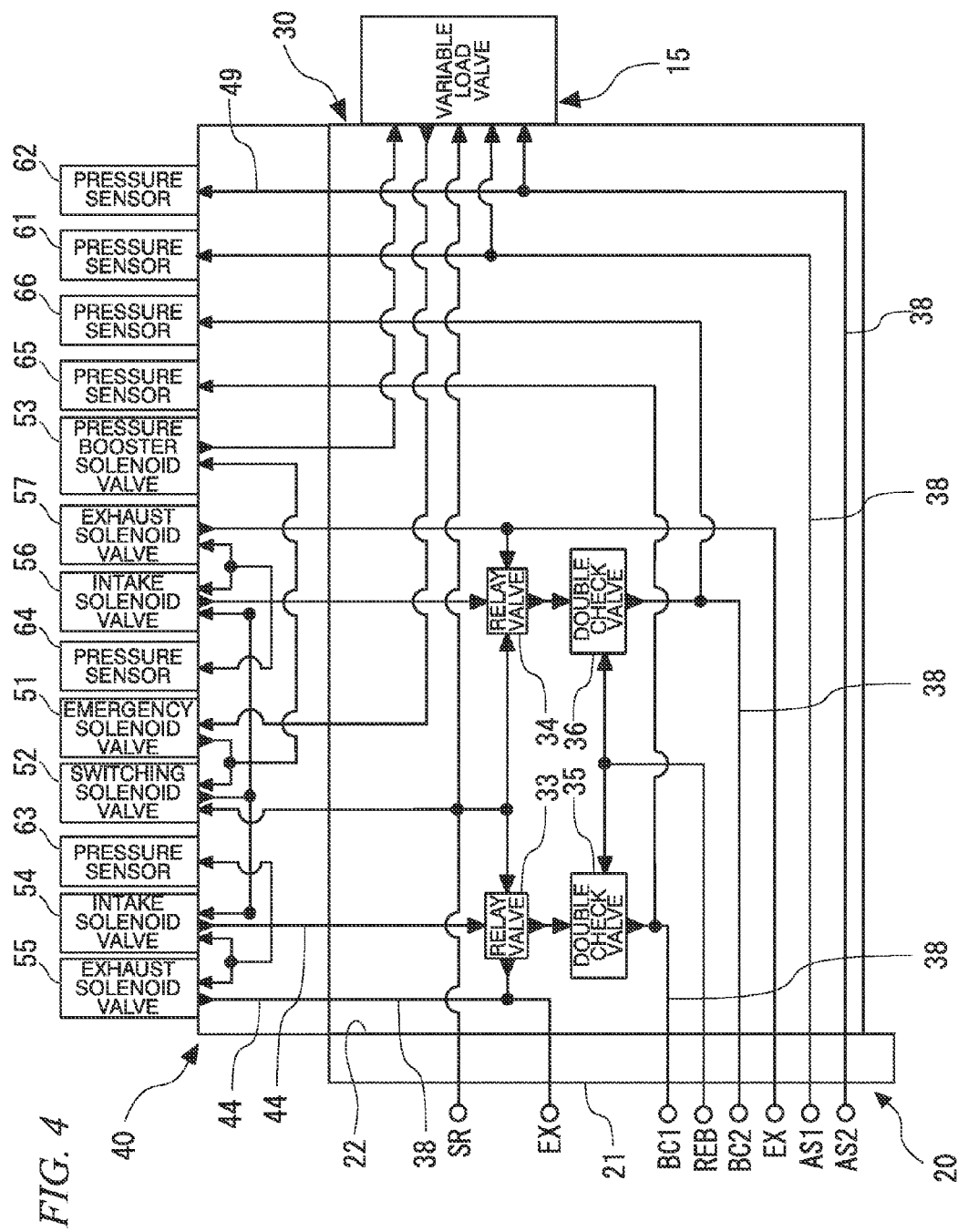
FIG. 4 is an explanatory drawing showing schematic piping routes of the brake control device according to the embodiment of the present invention.

In the present embodiment, as shown in FIG. 4, a first surface (outer surface side) 21 of the pipe seat 20 comprises; a first input port into which air pressure for brake application is input from a first air supply source SR during service and emergency operation, a first output port which outputs a drive pressure for driving brakes BC1 and BC2, a second input port into which the pressure of air springs AS1 and AS2 attached to the vehicle is input, a second output port which vents air from the various exhaust ports EX, and a third input port into which the air pressure for brake application is input from the second air supply source REB. Furthermore, the pipe seat 20, on a second surface (inner surface side) 22 thereof which supports the valve block 30, comprises input and output ports which communicate with flow channels (support member internal air channels) of these input and output ports and the valve block 30. Accordingly, inside the pipe seat 20, flow channels (support member internal air channels) which connect between the ports of the first surface 21 and the second surface 22 are formed in predetermined routes corresponding to the arrangement of the valve block 30. In FIG. 4, because the specific manner in which the first air supply source SR, the brakes BC1 and BC2, the air springs AS1 and AS2, and the various exhaust ports EX are configured is not significant in the context of the present invention, these components are omitted from the figure and represented by circle signs. Furthermore, FIG. 4 shows the brake control device 10 of the present invention schematically, and should not be construed as limiting the arrangement and the like of the components. Thus, the pipe seat 20 mounted to the brake control device 10 of the present invention can have a simple construction because only the input and output ports and flow channels are formed therein. In the pipe seat 20, for example, a silencer 17 which suppresses the ambient noise of the exhaust from the exhaust ports EX is provided as shown in FIG. 1.

The valve block 30 is composed of a block (chassis) made of metal (for example aluminum), and in a surface 31 thereof there is formed a recess section 32 for mounting the variable load valve 15. In the top surface of the recess section 32 is formed a female screw hole (not shown) into which the bolts 14 are threaded. Consequently, by removing the bolts 14 directly from the outside, the variable load valve 15 can be easily removed for replacement or the like. Furthermore, in the valve block 30 are formed; a first valve insertion section 30a into which a pair of relay valves 33 and 34 are removably inserted from a bottom surface side thereof, and a second valve insertion section 30b into which a pair of double check valves 35 and 36 are removably inserted from the side surface thereof. Furthermore, leg sections 37 for connecting to the pipe seat 20 protrude from the back surface of the valve block 30. In the back surface of the valve block 30 are provided ports and the like (not shown) which communicate with the input and output ports (on the second surface 22 side) of the pipe seat 20 described above.

Figure 5:
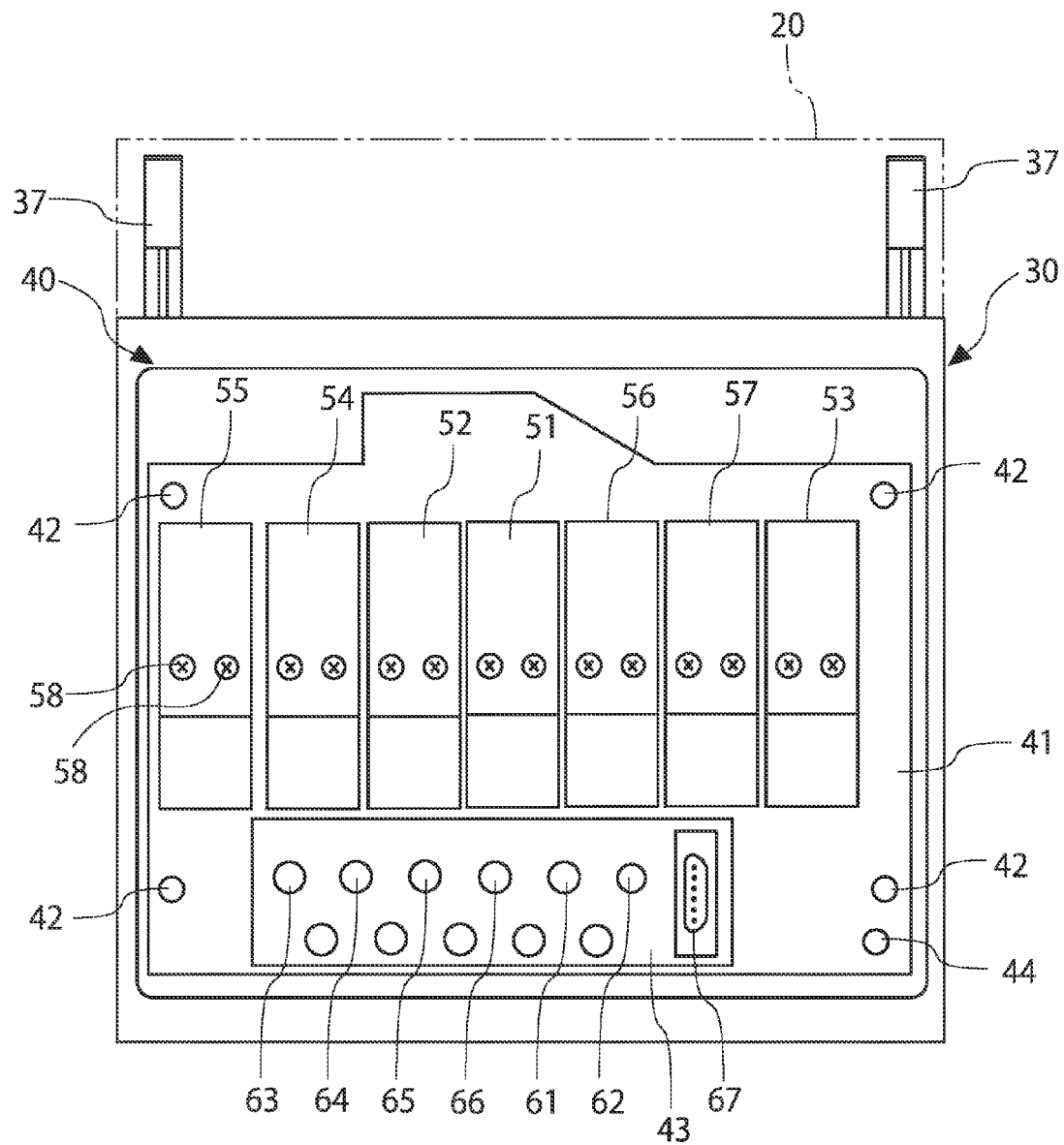
FIG. 5 is a plan view of an electropneumatic plate installed in the brake control device according to the embodiment of the present invention.

The electropneumatic plate 40, as shown in FIG. 5, comprises: a plate body 41; guide shafts 42 standing upright from the vicinity of the four corners of the plate body 41, which support the casing 13; a plurality of solenoid valves 51 to 57 (an emergency solenoid valve 51, a switching solenoid valve 52, a pressure booster solenoid valve 53, and two sets of pair of an intake solenoid valve and exhaust solenoid valve, which are an intake solenoid valve 54 and exhaust solenoid valve 55, and an intake solenoid valve 56 and exhaust solenoid valve 57, in the present invention) secured to the plate body 41; and an electrical block 43 on which a plurality of pressure sensors 61 through 66 and a connector 67 are disposed. The solenoid valves 51 to 57 comprise connecting bolts 58 which connect solenoid valve control signal wires 45 shown in FIG. 3. Furthermore, in the plate body 41 there are formed solenoid valve connecting air channels 44 which communicate between the solenoid valves 51 through 57 and the valve block 30.

Figure 6:
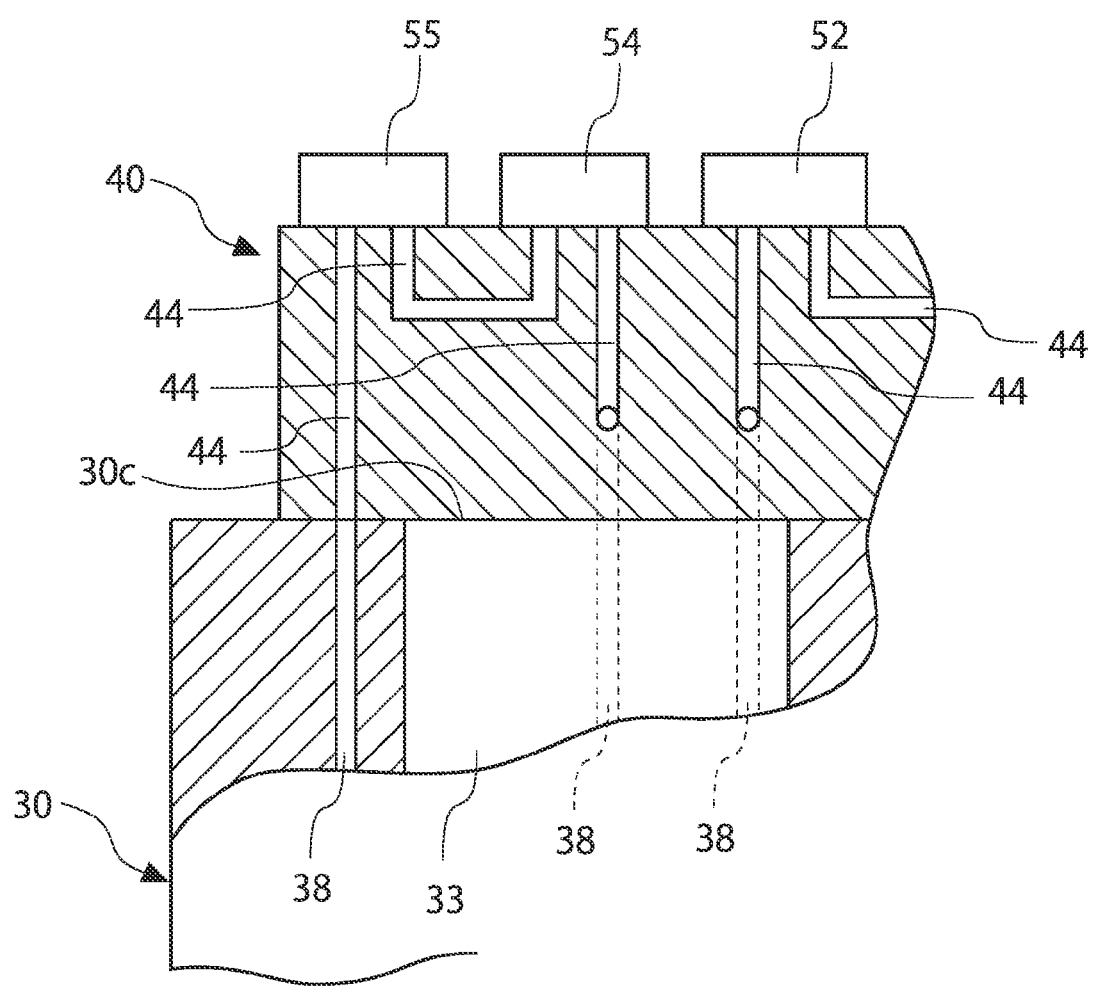
FIG. 6 is an enlarged cross-sectional view showing the main components of the brake control device according to the embodiment of the present invention.

The solenoid valve connecting air channels 44, for example, as shown in FIG. 6, are formed to pass through between the top and bottom surfaces of the plate body 41 so as to extend between the solenoid valves 51 through 57 (solenoid valves 55, 54, and 52 in FIG. 6) and the valve block 30 (or the pipe seat 20). At this time, in those parts of the valve block 30 where the relay valves 33 and the like are arranged, the solenoid valve connecting air channels 44 follow an indirect route incorporating bends and the like so as to avoid the relay valves 33 and the like. As a result, the valve block 30 (or the pipe seat 20) can communicate with the support member internal air channels 38. Furthermore, the valve insertion section 30a into which the relay valves 33 and 34 are inserted, passes completely through the valve block 30 such that there is an opening 30c in the top surface (first surface) of the valve block 30.

As shown in FIG. 3 and FIG. 5, solenoid valve control signal wires 45 are connected to the solenoid valves 51 to 57.

Furthermore, the solenoid valve control signal wires 45 are connected to a relay connector 46. In addition, the relay connector 46 and the controller 16 are connected via a control signal wire 18. At this time, the solenoid valve control signal wires 45 of at least two of the solenoid valves 51 to 57 may be connected to the relay connector 46, and a plurality of relay connectors 46 may be used if required.

The pressure sensors 61 to 66 are connected through a connector 47 provided on the electrical block 43, and a connector 19 of the controller 16 are connected via a pressure detection wire (for example a flexible cable) 48. In addition, in the electropneumatic plate 40, sensor air channels 49 are formed which connect to the pressure sensors 61 to 66. The solenoid valve connecting air channels 44, support member internal air channels 38, and sensor air channels 49 shown in FIG. 3 and FIG. 6 are for convenience of explanation, and do not show the actual piping routes. Furthermore, in FIG. 4, the solenoid valve connecting air channels 44, the support member internal air channels 38, and the sensor air channels 49 are shown by lines for schematic piping routes (channels). In FIG. 4, an arrowhead indicates an input or output flow port. The orientation of the arrowhead indicates the direction in which the air pressure is supplied.

The variable load valve 15 outputs an emergency control pressure proportional to the variable load signal pressure from the air springs AS1 and AS2 indicating pressure variation in proportion to the total weight of the vehicle including the weight of passengers and the like. Furthermore, on the side surface of the variable load valve 15 is provided an adjustment screw (adjustment mechanism) 15a which adjusts the output value (emergency control pressure) relative to the input value from the air springs AS1 and AS2, allowing for easy access from outside.

Next, the functions of the various valves for flow adjustment and the like of the compressed air are described with reference to the explanatory drawing of connection routes shown in FIG. 7. In the present embodiment, the brake control device 10 comprises three brake systems 71, 72, and 73 for service brake, emergency brake, and security brake.

As the solenoid valves 51 to 57 described above, in the present embodiment there are provided one each of an emergency solenoid valve 51, a switching solenoid valve 52, and a pressure booster solenoid valve 53. Also provided are two pairings of valves, one comprising an intake solenoid valve 54 and an exhaust solenoid valve 55, and the other an intake solenoid valve 56 and an exhaust solenoid valve 57. Each pairing of an intake solenoid valve 54 and exhaust solenoid valve 55 and of an intake solenoid valve 56 and exhaust solenoid valve 57 corresponds to a relay valve 33 and 34 respectively.

Figure 7:
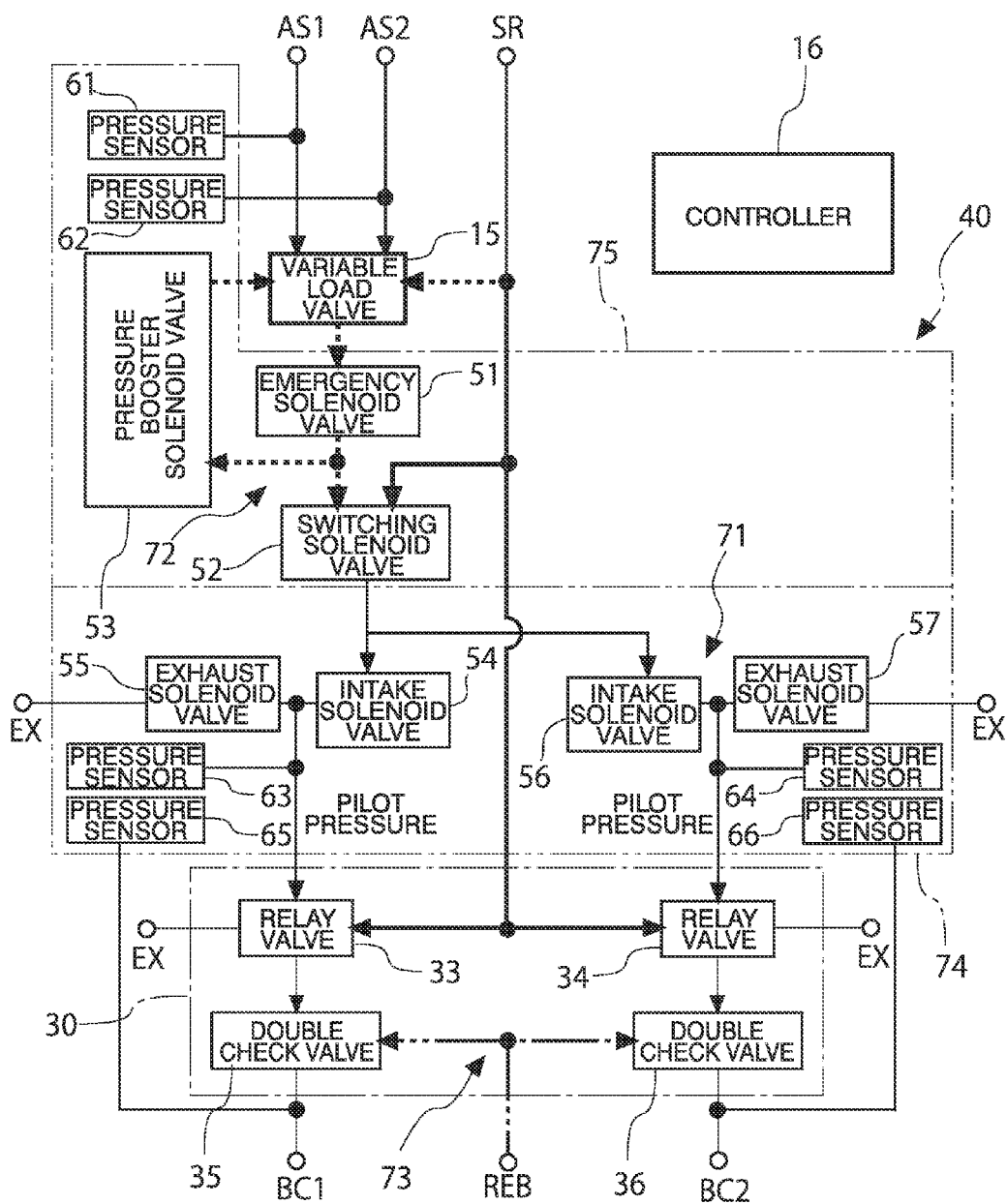
FIG. 7 is an explanatory drawing of a brake system in the brake control device according to the embodiment of the present invention.

In the brake system 71 for service operation indicated by the bold solid lines in FIG. 7, air pressure supplied from the first air supply source SR is supplied to the switching solenoid valve 52. The air pressure supplied to the switching solenoid valve 52 is then supplied from this switching solenoid valve 52 to the pairings of an intake solenoid valve 54 and exhaust solenoid valve 55, and an intake solenoid valve 56 and exhaust solenoid valve 57, regulated to a predetermined pilot pressure (for example 880 kPa) by the intake solenoid valve 54 and the exhaust solenoid valve 55 and the intake solenoid valve 56 and the exhaust solenoid valve 57, and then supplied to the relay valves 33 and 34.

In the brake system 72 for emergency brake operation indicated by the bold dashed lines in FIG. 7, the air pressure supplied from the first air supply source SR is regulated by the variable load valve 15 with reference to the air pressure output from the air springs AS1 and AS2. At this time, to the variable load valve 15 is connected the pressure booster solenoid valve 53, which amplifies the air pressure of the predetermined pilot pressure (for example 400 kPa) output from the emergency solenoid valve 51.

In an emergency operation (for example when the main power supply turns off), the emergency solenoid valve 51, the switching solenoid valve 52, and the pairings of the intake solenoid valve 54 and exhaust solenoid valve 55 and the intake solenoid valve 56 and exhaust solenoid valve 57 transition to an open state, and the amplified air pressure (pilot pressure) output from the variable load valve 15 is passed directly through, in functional terms, and supplied to the relay valves 33 and 34.

The purpose of the relay valves 33 and 34 is to regulate the amount of compressed air (the compressed air pressure) supplied to the corresponding brake BC1 or BC2. In service operation, the compressed air is supplied directly to the respective relay valves 33 and 34 from the first air supply source SR. One pairing of an intake solenoid valve 54 or 56 and an exhaust solenoid valve 55 or 56, whose purpose is to produce (regulate) the pilot pressure for moving the valves of the relay valves 33 and 34, is provided for each of the relay valves 33 and 34.

The double check valves 35 and 36 are connected to the relay valves 33 and 34 and are shared by the brake system 71 for service operation and the brake system 72 for emergency operation, and are also connected to the brake system 73 for security operation shown by the bold two dot chain line in FIG. 7. The double check valves 35 and 36 are supplied directly with air pressure from the second air supply source REB.

As a result, the double check valves 35 and 36 supply the pilot air pressure supplied to the relay valves 33 and 34 by the brake system 71 during service operation, to the brakes BC1 and BC2 as a drive pressure. Furthermore, the double check valves 35 and 36 supply the pilot air pressure supplied to the relay valves 33 and 34 by the brake system 72 during emergency operation, to the brakes BC1 and BC2 as the drive pressure. In addition, the double check valves 35 and 36 supply the air pressure supplied from the second air supply source REB by the brake system 73 during security operation, to the brakes BC1 and BC2 as the drive pressure.

On the other hand, of the pressure sensors 61 to 66, the output pressure of the air springs AS1 and AS2 is detected by the pressure sensors 61 and 62, the output pressure (pilot pressure) from each pairing of the intake solenoid valve 54 and exhaust solenoid valve 55 and the intake solenoid valve 56 and exhaust solenoid valve 57 is detected by the pressure sensors 63 and 64, and the drive pressure of the double check valves 35 and 36 is detected by the pressure sensors 65 and 66. Furthermore, the detection signals (pressure signals) thereof are output to the controller 16. The controller 16 controls, for example, the amplification by the pressure booster solenoid valve 53, and the pressure regulation by each pairing of the intake solenoid valve 54 and exhaust solenoid valve 55 and the intake solenoid valve 56 and exhaust solenoid valve 57 based on these detection signals.

Incidentally, each of the pairings of the intake solenoid valve 54 and exhaust solenoid valve 55 and the intake solenoid valve 56 and exhaust solenoid valve 57 constitute a first solenoid valve group 74 which generates a pilot pressure from the air pressure generated by the first air supply source SR during service operation. The emergency solenoid valve 51, the pressure booster solenoid valve 53, and the switching solenoid valve 52 constitute a second solenoid valve group 75 which outputs, as a pilot pressure, a pressure proportional to the pressure output from the variable load valve 15 during emergency operation. Here, when the pressure output from the variable load valve 15 is to be amplified by the pressure booster solenoid valve 53, the pressure output from the variable load valve 15 is input into and amplified by the pressure booster solenoid valve 53, the amplified pressure is input into the variable load valve 15, and the pressure amplified in proportion to the input pressure is output by the variable load valve 15 to serve as the pilot pressure. Furthermore, if the pressure is not to be amplified by the pressure booster solenoid valve 53, the pressure output from the variable load valve 15 serves as the pilot pressure directly.

Thus, the brake control device 10 of the present embodiment comprises; an air braking section 60 which converts the air pressure generated by the first air supply source SR to a drive pressure having a predetermined pressure for driving the brakes BC1 and BC2, and a pipe seat 20 furnished with a first surface 21 having external ports to which the first air supply source SR and the brakes BC1 and BC2 are connected, and a second surface 22 to which the air braking section 60 is connected.

The air braking section 60 comprises; the valve block 30, the plurality of solenoid valves 51 to 57, the controller 16, and the electropneumatic plate 40. The valve block 30 comprises valves (relay valves 33 and 34, double check valves 35 and 36, variable load valve 15, and the like) which regulate or switch the input air pressure and output the result. The plurality of solenoid valves 51 to 57 comprise an input port into which air pressure is input, and an output port from which air pressure is output, with each port capable of switching between open and closed states. The controller 16 is electrically connected to the plurality of solenoid valves 51 to 57 via the solenoid valve control signal wires 45, and controls the plurality of solenoid valves 51 to 57 electrically. The electropneumatic plate 40 comprises solenoid valve connecting air channels 44 which connect to the input ports and output ports of the plurality of solenoid valves 51 to 57. In the electropneumatic plate 40, the plurality of solenoid valves 51 to 57 are provided so as to communicate with the solenoid valve connecting air channels 44 corresponding to the input ports and output ports.

The electropneumatic plate 40 is secured to a support member in the form of the pipe seat 20 or the valve block 30, and at least one of the solenoid valve connecting air channels 44 communicates with a support member internal air channel 38 formed in the support member.

Thus, because the plurality of solenoid valves 51 to 57 are installed on the electropneumatic plate 40 secured to the valve block 30 and consolidated into one location, the solenoid valve control signal wires 45 from the solenoid valves 51 through 57 to the controller 16 do not demand complex wiring in the vicinity of the valve block 30 and other components. Furthermore, regarding the solenoid valve connecting air channels 44 that connect to the solenoid valves 51 to 57, because the position where they connect to the solenoid valves 51 through 57 and the position where they connect to the valve block 30 can be selected freely, and they can be laid out freely within the electropneumatic plate 40 so as to connect these positions to each other, the plurality of solenoid valves 51 through 57 can be disposed in a compact arrangement on the electropneumatic plate 40, unrestricted by the locations of the connecting air channels 44.

Furthermore, by bundling at least two of the solenoid valve control signal wires 45 connected to the plurality of solenoid valves 51 through 57 into a single relay connector 46 connected to the controller 16, the solenoid valve control signal wires 45 can be better organized, and connecting and disconnecting the solenoid valves 51 through 57 to and from the controller 16 is simplified.

In addition, the air braking section 60 comprises a plurality of pressure sensors 61 to 66 which detect air pressure, installed on the electropneumatic plate 40 and connected to the controller 16 via the pressure detection wires 48. In the electropneumatic plate 40 there are formed the sensor air channels 49 which connect to the pressure sensors 61 to 66. Thus, the pressure sensors 61 to 66 connected to the controller 16 via the pressure detection wires 48 can also be installed on the electropneumatic plate 40 and consolidated into one location, and the wiring connected to the controller 16, including the pressure detection wire 48, can be better organized.

Moreover, the valve block 30 is formed as a block (housing) comprising a first valve insertion section 30a into which valves in the form of the relay valves 33 and 34 are inserted. The electropneumatic plate 40 is secured to a first surface (the top surface) of the housing (valve block 30) in which the opening 30c of the first valve insertion section 30a is formed. As a result, even on the surface of the housing where the opening 30c of the first valve insertion section 30a is formed and where it is difficult to form the solenoid valve connecting air channels 44, the electropneumatic plate 40 can be secured and the plurality of solenoid valves 51 to 57 disposed, enabling an efficient use of space and thus a more compact device.

DESCRIPTION OF THE REFERENCE SYMBOLS

AS1, AS2 Air springs
SR First air supply source
REB Second air supply source
EX Exhaust port
BC1, BC2 Brake
10 Brake control device
11 Bracket
12 Frame
13 Casing
14 Bolt
15 Variable load valve
15a Adjustment screw (adjustment mechanism)

16 Controller
17 Silencer
18 Control signal wire
19 Connector
20 Pipe seat
21 First surface (of pipe seat 20)
22 Second surface (of pipe seat 20)
30 Valve block
30a First valve insertion section
30b Second valve insertion section
30c Opening
31 Surface
32 Recess section
33, 34 Relay valve
35, 36 Double check valve
37 Leg section
38 Support member internal air channels
40 Electropneumatic plate (plate)
41 Plate body
42 Guide shaft
43 Electrical block
44 Solenoid valve connecting air channel
45 Solenoid valve control signal wire
46 Relay connector
47 Connector
48 Pressure detection wire
49 Sensor air channel
50 Main unit
51 Emergency solenoid valve
52 Switching solenoid valve
53 Pressure booster solenoid valve
54, 56 Intake solenoid valve
55, 57 Exhaust solenoid valve
58 Wire
60 Control section
61 to 66 Pressure sensor
67 Connector
71 Brake system for service operation
72 Brake system for emergency operation
73 Brake system for security operation
74 First solenoid valve group
75 Second solenoid valve group

What is claimed is:

1. A brake control device comprising;
    an air braking section which converts an air pressure produced by an air supply source to a drive pressure of a predetermined pressure which drives a brake; and
    a pipe seat furnished with a first surface having an external port that connects to the air supply source and a braking side and a second surface to which said air braking section is connected,
    said air braking section comprising:
    a valve block furnished with valves regulating or switching and then outputting input air pressure, said valve block fully enclosing the valves;
    a plurality of solenoid valves which have input ports into which air pressure is input and output ports from which air pressure is output, and which switch between open and closed states;
    a controller which is electrically connected to said plurality of solenoid valves by solenoid valve control signal wires, and which controls said plurality of solenoid valves electrically; and
    a plate which comprises solenoid valve connection air channels which connect to said input ports and said output ports of said plurality of solenoid valves, onto which is installed said plurality of solenoid valves such that said solenoid valve connection air channels communicate with said corresponding input ports and output ports, which is secured to a support member being said pipe seat or said valve block, in which at least one of said solenoid valve connection air channels communicates with a support member air channel formed in said support member, and which is disposed between said valve block and said plurality of solenoid valves.

2. A brake control device according to claim 1, wherein at least two of said solenoid valve control signal wires connected to said plurality of solenoid valves are bundled into a single connector and connected to said controller.

3. A brake control device according to claim 2, wherein said air brake section further comprises a plurality of pressure sensors which detect air pressure, installed on said plate and connected to said controller via pressure detection wires, and
    sensor air channels which connect to said pressure sensors are formed in said plate.

4. A brake control device according to claim 3, wherein said valve block comprises a housing with a valve insertion section into which said valves are inserted, and
    said plate is secured to a surface of said housing in which an opening of said valve insertion section is formed.

5. A brake control device according to claim 2, wherein said valve block comprises a housing with a valve insertion section into which said valves are inserted, and
    said plate is secured to a surface of said housing in which an opening of said valve insertion section is formed.

6. A brake control device according to claim 1, wherein said air brake section further comprises a plurality of pressure sensors which detect air pressure, installed on said plate and connected to said controller via pressure detection wires, and
    sensor air channels which connect to said pressure sensors are formed in said plate.

7. A brake control device according to claim 6, wherein said valve block comprises a housing with a valve insertion section into which said valves are inserted, and
    said plate is secured to a surface of said housing in which an opening of said valve insertion section is formed.

8. A brake control device according to claim 1, wherein said valve block comprises a housing with a valve insertion section into which said valves are inserted, and
    said plate is secured to a surface of said housing in which an opening of said valve insertion section is formed.

* * * * *